(12) United States Patent
Miller et al.

(10) Patent No.: US 8,152,691 B2
(45) Date of Patent: Apr. 10, 2012

(54) SHIFT CONTROL METHOD FOR AN AUTOMATIC GROUP TRANSMISSION

(75) Inventors: Martin Miller, Immenstaad (DE); Bernd Doebele, Salem (DE); Josef Bader, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 457 days.

(21) Appl. No.: 12/528,513

(22) PCT Filed: Feb. 22, 2008

(86) PCT No.: PCT/EP2008/052161
§ 371 (c)(1),
(2), (4) Date: Aug. 25, 2009

(87) PCT Pub. No.: WO2008/107316
PCT Pub. Date: Sep. 12, 2008

(65) Prior Publication Data
US 2010/0323845 A1 Dec. 23, 2010

(30) Foreign Application Priority Data
Mar. 6, 2007 (DE) .......................... 10 2007 010 827

(51) Int. Cl.
*F16H 59/30* (2006.01)
*F16H 59/00* (2006.01)
*F16H 37/02* (2006.01)

(52) U.S. Cl. ........................ 477/124; 74/336 R; 475/209

(58) Field of Classification Search ............... 477/94, 477/124; 74/331, 335, 336 R, 339; 475/208, 475/209, 218
See application file for complete search history.

(56) References Cited

U.S. PATENT DOCUMENTS

| 3,508,450 | A | | 4/1970 | Richards |
| 5,042,327 | A | * | 8/1991 | Stainton .......................... 477/73 |
| 5,490,063 | A | * | 2/1996 | Genise ............................. 701/1 |
| 6,440,032 | B1 | | 8/2002 | Stauber et al. |
| 7,021,170 | B2 | | 4/2006 | Dobele |
| 7,976,431 | B2 | * | 7/2011 | Bader et al. .................. 477/109 |
| 2009/0071274 | A1 | * | 3/2009 | Bader et al. ..................... 74/335 |
| 2010/0071491 | A1 | * | 3/2010 | Muller et al. ................... 74/331 |
| 2010/0319485 | A1 | * | 12/2010 | Miller et al. .................... 74/664 |

FOREIGN PATENT DOCUMENTS

| DE | 198 31 293 A1 | 1/2000 |
| DE | 101 43 994 A1 | 3/2003 |
| DE | 101 52 857 A1 | 5/2003 |
| EP | 1 055 845 A2 | 11/2000 |

OTHER PUBLICATIONS

ATZ Sep. 2004, pp. 772-783.

* cited by examiner

*Primary Examiner* — Roger Pang
(74) *Attorney, Agent, or Firm* — Davis & Bujold, P.L.L.C.

(57) ABSTRACT

A method for controlling shifts in an automated group transmission that comprises a multi-stage main transmission, a multi-stage splitter group connected upstream from the main transmission and a multi-stage range-change group connected downstream from the main transmission. The method includes the steps of disengaging the separator clutch to relieve the load of the motor; shifting range-change group to neutral and bringing the speed of the motor to the synchronous speed of the target gear; braking the main transmission and the splitter or upstream group via a transmission brake; changing the transmission ratios in the main transmission and in the splitter group; synchronizing the range-change group by partially engaging the separator clutch; engaging the desired transmission ratio in the range-change group; and simultaneously increasing the load on the drive motor and fully engaging the separator clutch.

7 Claims, 7 Drawing Sheets

| Gear Step | | STANDARD CONFIGURATION WITH 16 GEARS | |
|---|---|---|---|
| 1 Gear | 8<-->9 | Gate S3/4<--> | Gate S1/2 |
| 2 Gear | 7<-->9 | Gate S3/4<--> | Gate S1/2 |
| | 8<-->10 | Gate S3/4<--> | Gate S1/2 |
| 3 Gear | 6<-->9 | Gate S3/4<--> | Gate S1/2 |
| | 7<-->10 | Gate S3/4<--> | Gate S1/2 |
| | 8<-->11 | Gate S3/4<--> | Gate S1/2 |
| 4 Gear | 5<-->9 | Gate S3/4<--> | Gate S1/2 |
| | 6<-->10 | Gate S3/4<--> | Gate S1/2 |
| | 7<-->11 | Gate S3/4<--> | Gate S1/2 |
| | 8<-->12 | Gate S3/4<--> | Gate S1/2 |

Fig. 2a
(PRIOR ART)

| Gear Step | | STANDARD CONFIGURATION WITH 12 GEARS | |
|---|---|---|---|
| 1 Gear | 6<-->7 | Gate S2/3<--> | Gate S1/R |
| 2 Gear | 5<-->7 | Gate S2/3<--> | Gate S1/R |
| | 6<-->8 | Gate S2/3<--> | Gate S1/R |
| 3 Gear | 4<-->7 | Gate S2/3<--> | Gate S1/R |
| | 5<-->8 | Gate S2/3<--> | Gate S1/R |
| 4 Gear | 3<-->7 | Gate S2/3<--> | Gate S1/R |
| | 4<-->8 | Gate S2/3<--> | Gate S1/R |

Fig. 2b
(PRIOR ART)

| Gear Step | | INVENTIVE CONFIGURATION WITH 16 GEARS | |
|---|---|---|---|
| 1 | Gear | 8<-->9 | Gate S1/4 |
| 2 | Gear | 7<-->9 | Gate S1/4 |
| | | 8<-->10 | Gate S1/4 |
| 3 | Gear | 6<-->9 | Gate S1/4<--> Gate S2/3 |
| | | 7<-->10 | Gate S1/4 |
| | | 8<-->11 | Gate S1/4<--> Gate S2/3 |
| 4 | Gear | 5<-->9 | Gate S1/4<--> Gate S2/3 |
| | | 6<-->10 | Gate S1/4<--> Gate S2/3 |
| | | 7<-->11 | Gate S1/4<--> Gate S2/3 |
| | | 8<-->12 | Gate S1/4<--> Gate S2/3 |

Fig. 4a

| Gear Step | | INVENTIVE CONFIGURATION WITH 12 GEARS | |
|---|---|---|---|
| 1 | Gear | 6<-->7 | Gate S1/3 |
| 2 | Gear | 5<-->7 | Gate S1/3 |
| | | 6<-->8 | Gate S1/3 |
| 3 | Gear | 4<-->7 | Gate S1/3<--> Gate S2/R |
| | | 5<-->8 | Gate S1/3 |
| 4 | Gear | 3<-->7 | Gate S1/3<--> Gate S2/R |
| | | 4<-->8 | Gate S1/3<--> Gate S2/R |

Fig. 4b

SHIFT CONTROL METHOD FOR AN AUTOMATIC GROUP TRANSMISSION

This application is a national stage completion of PCT/EP 2008/052161 filed Feb. 22, 2008 which claims priority from German Application Serial No. 10 2007 010 827.5 filed Mar. 6, 2007

FIELD OF THE INVENTION

The invention concerns a shift control method for an automated group transmission

BACKGROUND OF THE INVENTION

Group transmissions with a multi-gear main transmission, an upstream group in drive connection upstream from the latter and a range-change group in drive connection downstream thereof have been known for a long time and are preferably used in utility vehicles. By designing the upstream group, which usually has two stages and can also be called the splitter group, with a small transmission ratio interval, the transmission ratio intervals between the transmission ratio steps of the main transmission are approximately halved and the total number of transmission ratio steps available is thus doubled. By virtue of usually a two-stage range-change group the spread of the transmission, as a whole is substantially increased and the total number of transmission ratio steps is again doubled. Hence, in combination with a three-step main transmission (with three forward gears and a reverse gear), a 12-gear group transmission (with a total of 12 forward gears and a maximum of 4 reverse gears) is obtained, and in combination with a four-stage main transmission (with four forward gears and one reverse gear) a 16-gear group transmission (with a total of 16 forward and a maximum of 4 reverse gears) is obtained.

Compared with an individual transmission with a comparable number of gears and similar gear steps and spread, the group transmission has far more compact dimensions and lower weight. However, since many shift operations in a group transmission entail changing transmission ratio steps in more than one of the part-transmissions and therefore take place in a relatively complex manner, most of the known group transmissions are designed to be shifted with either partial or full automation.

A review of automated group transmissions by the present applicant has been published in ATZ September 2004 on pages 772-783. From the model series known as the AS-Tronic family of automated shift transmissions, the AS-Ironic-mid series transmissions designed for medium-weight utility vehicles and the AS-Tronic transmissions provided for heavy utility vehicles are known, in each case designed as group transmissions with a multi-step main transmission, i.e. one comprising three or four forward gears, a two-stage splitter group upstream from the main transmission, and a two-stage range-change group downstream from the main transmission.

In each case the main transmission is of countershaft design, and provided with unsynchronized claw-type clutches, and in the case of the AS-Ironic-mid series comprises a single countershaft. For reasons to do with weight and structural space optimization, the transmissions of the AS-tronic series have two countershafts. In both series the main transmission is optionally available in a direct-gear version ($i_{HG\_min}=1$) or in a fast-gear version ($i_{HG\_min}<1$).

In each case the splitter group is designed as an upstream transmission with two shiftable input constants for the main transmission. In each case the range-change group is designed as a two-stage planetary transmission which can be shifted between a direct connection mode ($i_{BG}=1$) and an alternative, high transmission ratio ($i_{BG}\gg1$).

Other group transmission designs, in each case with a main transmission, an upstream splitter group and a downstream range-change group, are known for example from DE 101 43 994 A1.

In the group transmissions of the AS-Tronic and AS-Tronic-mid series, until now the shifting clutches of the splitter group and of the range-change group, in each case combined in a common shifting packet, are all of synchronized design, while in contrast the main transmission is designed for claw-type shifting, i.e. to be shifted without synchronization. However, since synchronized shifting clutches are expensive because of their complex structure, take up a relatively large amount of structural space, and limit the life of the transmission as a whole because of wear, it is intended in future designs of such group transmissions to design the range-change group with claw-shifting means in addition to the main transmission.

By way of example, FIGS. 1a and 1b schematically show the structure of the group transmissions of the AS-Tronic series known per se. The main transmission HG is made as a direct-gear transmission of countershaft design and has a main shaft W2 and two countershafts W3a, W3b. In the version shown in FIG. 1a, the main transmission HG is a four-step transmission with four transmission ratio steps G1 to G4 for forward driving and a transmission ratio step R for reversing. In the version shown in FIG. 1b the main transmission HG is formed as a three-stage transmission with three transmission ratio steps G1 to G3 for forward driving and a transmission ratio step R for reversing.

The loose wheels of the transmission ratio steps G1, G2, G3, R and G1, G2, R respectively are in each case mounted to rotate on the main shaft W2 and can be engaged by means of associated claw clutches. The associated fixed wheels are arranged in a rotationally fixed manner on the countershafts W3a or W3b. The highest transmission ratio step G4 or G3 respectively, in each case made as a direct gear, can be engaged by means of a direct-shift clutch. So far as possible, in each case two shifting clutches at a time are combined in a common shifting packet S1/2, S3/4 or S1/R, S2/3. In the version shown in FIG. 3a the shifting packet SR comprises only the shifting clutch of the transmission ratio step R for reversing.

The upstream group VG is of two-stage design and is also made with countershafts, such that the two transmission ratio steps K1 and K2 form two shiftable input constants of the main transmission HG. By virtue of a small ratio difference between the two transmission ratio steps K1, K2 the upstream group VG constitutes a splitter group. The loose wheel of the first transmission ratio step K1 is mounted to rotate on the input shaft W1, which is connected to a drive motor in the form of an internal combustion engine by a controllable separator clutch located outside the area covered by the representations shown in FIGS. 1a and 1b. The loose wheel of the second transmission ratio step K2 is mounted to rotate on the main shaft W2. The fixed wheels of the two transmission ratio steps K1, K2 are respectively arranged in a rotationally fixed manner along the input side of the countershafts W3a, W3b extended on. The shifting clutches of the splitter group VG, which are of synchronized design, are combined in a common shifting packet SV.

The range-change group BG in drive connection on the downstream side is also of two-stage design, but is a planetary structure with a single planetary gearset. The sun gear PS is connected in a rotationally fixed manner to the main shaft W2 extended on the output side. The planetary gear carrier PT is connected rotationally fixed to the output shaft W4 of the group transmission. The annular gear PH is connected to a shifting packet SB comprising two shifting clutches, by means of which the range-change group BG can be shifted alternatively to a slow-drive stage L by connecting the ring gear PH to a fixed part of the housing, or to a fast-drive stage S by connecting the ring gear PH to the planetary gear carrier PT. In contrast to the previous design mode of AS-Tronic transmissions, the shifting clutches of the shifting packet SB are in this case of unsynchronized design.

In a group transmission of this type, owing to the unsynchronized design of the range-change group BG a special shifting sequence is needed, which is distinctly different from that of a largely identical group transmission, but one provided with a synchronized range-change group BG. A suitable method for controlling shifts in a group transmission with an unsynchronized range-change group BG is known, for example, from DE 101 52 857 A1. In this method it is essentially provided that for a range shift, the splitter group VG and the range-change group BG are each first shifted to their neutral position in order to interrupt the force flow, the main transmission HG is then braked by a transmission brake, and the adjustment of the speed the drive motor to the synchronous speed of the target gear begins. After shifting of the main transmission HG, the splitter group VG is shifted with synchronization to its target transmission ratio. When the drive motor has reached the synchronous speed, the target transmission ratio of the range-change group BG is engaged.

Since in a range shift the main transmission HG is shifted in the opposite direction to the range-change group BG, i.e. for an upshift of the range-change group BG from the slow-driving stage L to the fast-driving stage S, the main transmission HG is shifted from a high transmission ratio such as G4 or G3 to a lower ratio such as G1 or G2, with the arrangement of transmission ratio steps in ascending or descending sequence as has been usual until now a change is always necessary between two shift gates and the shifting packets associated with these. This relationship is summarized for the known group transmissions shown in FIGS. 1a and 1b, in the tables of FIGS. 2a and 2b, for various gear intervals. Since an automated gate change in each case entails controlling and stopping the associated adjusting drive, sensing that the first shifting packet is in the neutral position, switching between the two gates or shifting packets and controlling and sensing the adjusting drive in the target shift position(s) of the second shifting packet, a gate change has a disadvantageous delaying effect on the shift sequence as a whole.

Against this background, the purpose of the present invention is to propose a better method for controlling shift operations in an automated group transmission.

SUMMARY OF THE INVENTION

The method according to the invention for controlling a range shift can be used with a group transmission which comprises a multi-stage main transmission, a multi-stage splitter or upstream group that is connected upstream from the main transmission and a multi-stage range-change group that is connected downstream from the main transmission, in which the splitter or upstream group is connected via a controllable separator clutch to a drive motor in the form of an internal combustion engine, the main transmission and the range-change group are of unsynchronized design, and the shifting clutches in each case of two transmission ratio steps in the main transmission and the range-change group are respectively combined in a common shifting packet having two shift positions and a neutral position, so that during a range shift a change between two transmission ratio steps takes place at least in each of the main transmission and the range-change group.

In addition the method comprises the following process steps:
  the separator clutch to the drive motor is disengaged to relieve the load on the motor;
  the range-change group is shifted to neutral and speed management of the drive motor is started to bring it to the synchronous speed of the target gear;
  the main transmission and the splitter or upstream group are braked by means of a transmission brake;
  transmission ratios are changed in the main transmission and in the splitter or upstream group;
  the range-change group is synchronized by partially engaging the separator clutch;
  the desired transmission ratio is engaged in the range-change group;
  at the same time or with a temporary overlap, the load on the drive motor is increased and/or the separator clutch is fully engaged.

This method differs from the method known from DE 101 52 857 A1 essentially in that at the beginning of the range change, by disengaging the separator clutch to the drive motor and shifting the range-change group BG to neutral the group transmission is shifted without force, then the main transmission HG and the splitter or upstream group VG are braked until almost stationary by the transmission brake, preferably simultaneously, and the transmission ratio changes in the main transmission HG and the splitter or upstream group VG take place preferably parallel in time.

In a version of the method according to the invention alternative to the above, it can be provided that the transmission ratio changes in the main transmission HG and in the splitter or upstream group VG take place simultaneously or sequentially.

According to another variant it can be provided that together with the transmission ratio change in the main transmission HG, a change of gate takes place there.

Furthermore, it can be provided that the penultimate process step, i.e. the engagement of the new transmission ratio in the range-change group, takes place with the separator clutch at least partially disengaged.

Moreover, when using the method according to the invention it can be appropriate for a transmission ratio change to take place in the splitter or upstream group before the main transmission is braked. This enables the input speed of the main transmission to be adjusted to a value advantageous for the braking process.

Finally, it is regarded as advantageous for the main transmission and the splitter or upstream group to be braked to a speed such that the respective claw clutch can be engaged, preferably with low wear.

The method according to the invention can be used to good advantage for the control of transmission ratios, both with the known group transmission structure described and shown in FIGS. 1a and 1b, and with a further developed group transmission in which, in contrast to the group transmissions of FIGS. 1a and 1b, it is provided that in the main transmission the shifting clutches associated with the lowest transmission ratio and the highest transmission ratio are combined in a common shifting packet. The specific structure of this new group transmission will be explained in more detail below, with reference to two example embodiments.

Thanks to the new structure of the further developed group transmission mentioned, the lowest transmission ratio and the highest transmission ratio are assigned in terms of shifting pattern to one and the same shift gate. This brings the advantage that all range shifts, which involve a shift between the lowest and the highest transmission ratios in the main transmission, take place therewithin the same shift gate, simply by switching over the shifting packet concerned from one shift position to the other shift position. Accordingly, there is no need to carry out any separate speed adaptation for such a shift process. A change between two shift gates or two shifting packets, which was usual with the previous arrangement of gearsets and assignment of shifting packets, is now avoided so that the overall shifting time for the range shift and thus also the traction-force-free phase during the said range shift are shortened. In shifts of the group transmission that involve no shift in the range-change group, no time delay occurs since the gate change in the main transmission takes place during the main transmission synchronization phase.

BRIEF DESCRIPTION OF THE DRAWINGS

To clarify the invention the description of drawings with example embodiments is attached. The drawings show:

FIG. 2a is a tabular summary of the range-change shifts of the known group transmission shown in FIG. 1a FIG. 2b is a tabular summary of the range-change shifts of the known group transmission shown in FIG. 1b FIG. 4a is a tabular summary of the range-change shifts of the new group transmission shown in FIG. 3a FIG. 4b is a tabular summary of the range-change shifts of the new group transmission shown in FIG. 3b

DETAILED DESCRIPTION OF THE DRAWINGS

Figure 3A:
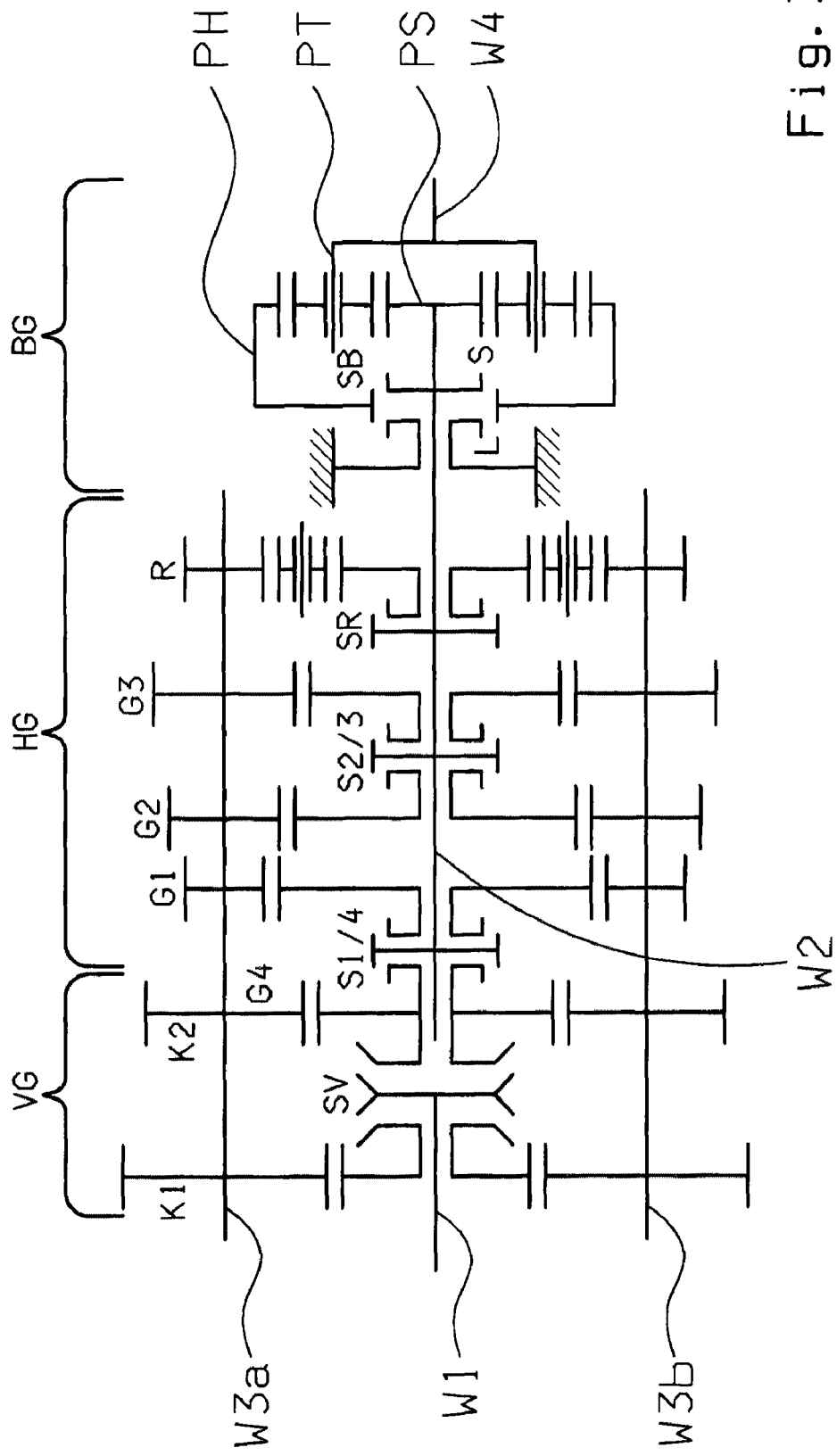
FIG. 3a is a schematic representation of the structure of a new group transmission with a four-stage main transmission
Figure 3B:
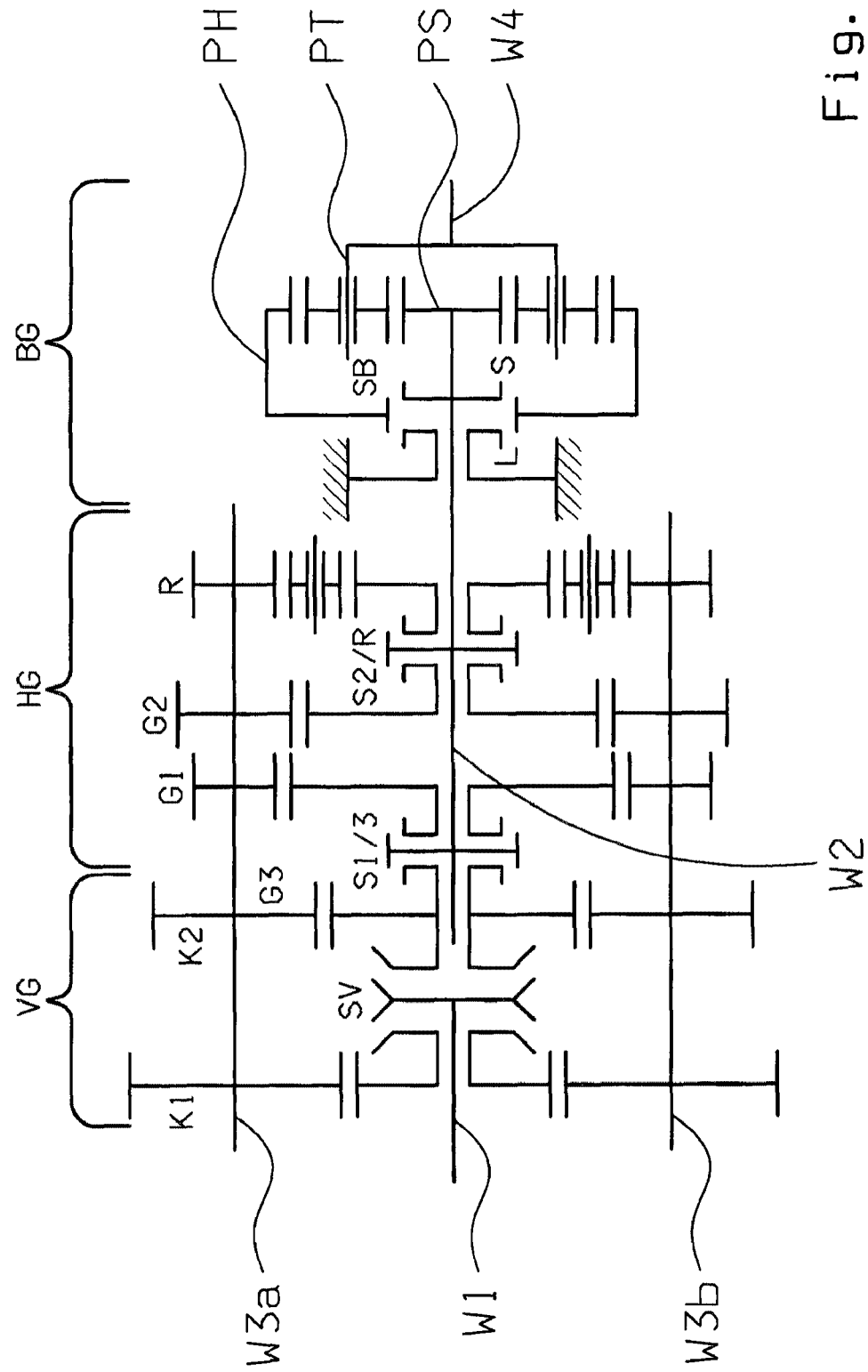
FIG. 3b is a schematic representation of the structure of a new group transmission with a three-stage main transmission

FIGS. 3a and 3b illustrate schematically, as examples, the structures of two new group transmissions. In each case the main transmission HG is of countershaft design and comprises a main shaft W2 and two countershafts W3a, W3b. In the version in FIG. 3a the main transmission HG is made with four transmission ratios G1 to G4 for forward driving and one transmission ratio R for reverse drive. In the version in FIG. 3b the main transmission HG has three transmission ratios G1 to G3 for forward driving and one transmission ratio R for reverse drive.

The loose wheels of the transmission ratios G1, G2, G3 and R or G1, G2 and R, respectively, are in each case mounted to rotate on the main shaft W2 and can be engaged by means of associated claw clutches. The associated fixed wheels are arranged in a rotationally fixed manner on the countershafts W3a or W3b. The respective highest transmission ratio G4 or G3, in each case made as a direct gear, can be engaged by means of a direct-shift clutch.

Figure 1A:
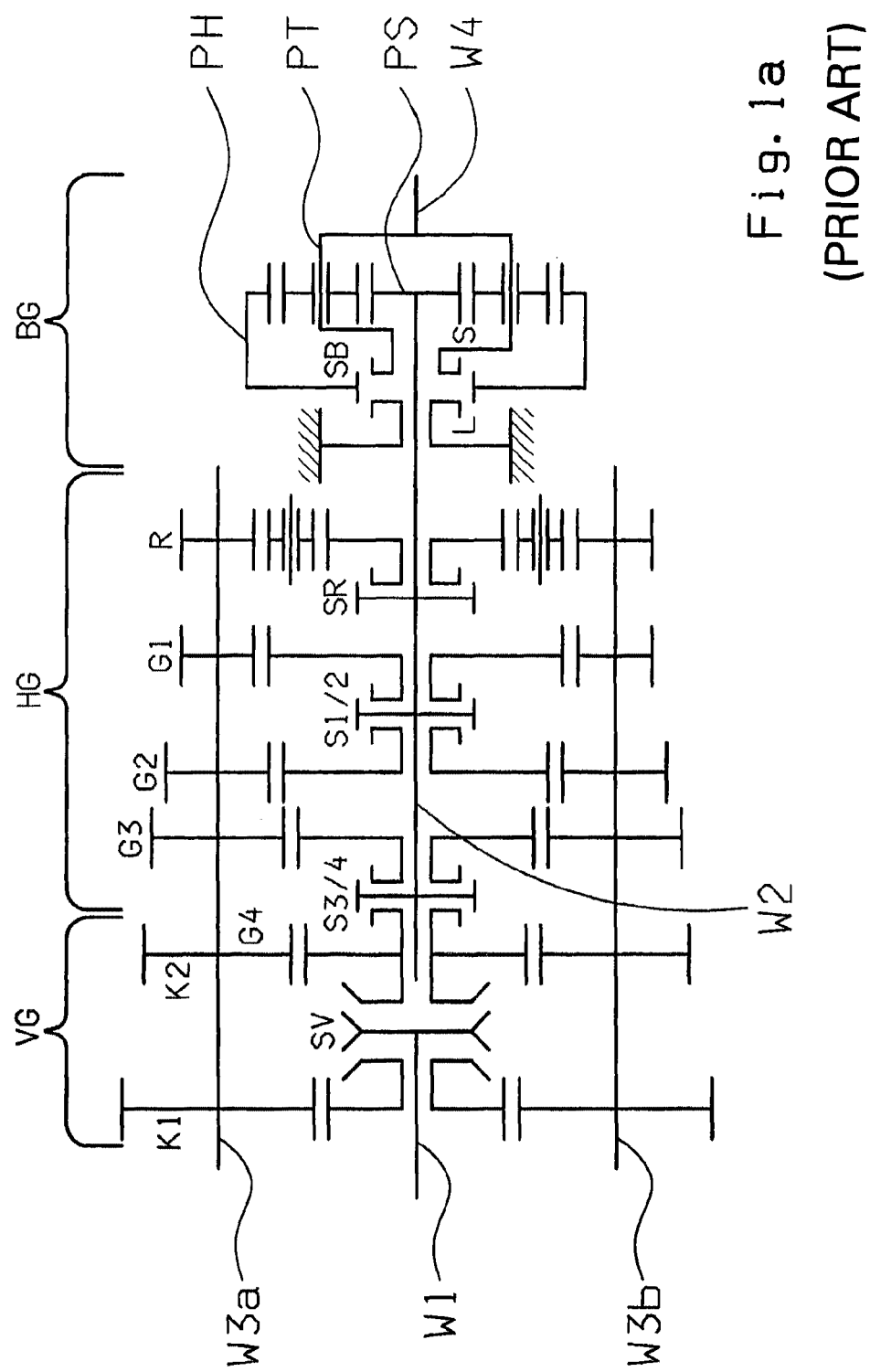
FIG. 1a is a schematic representation of the structure of a known group transmission with a four-stage main transmission
Figure 1B:
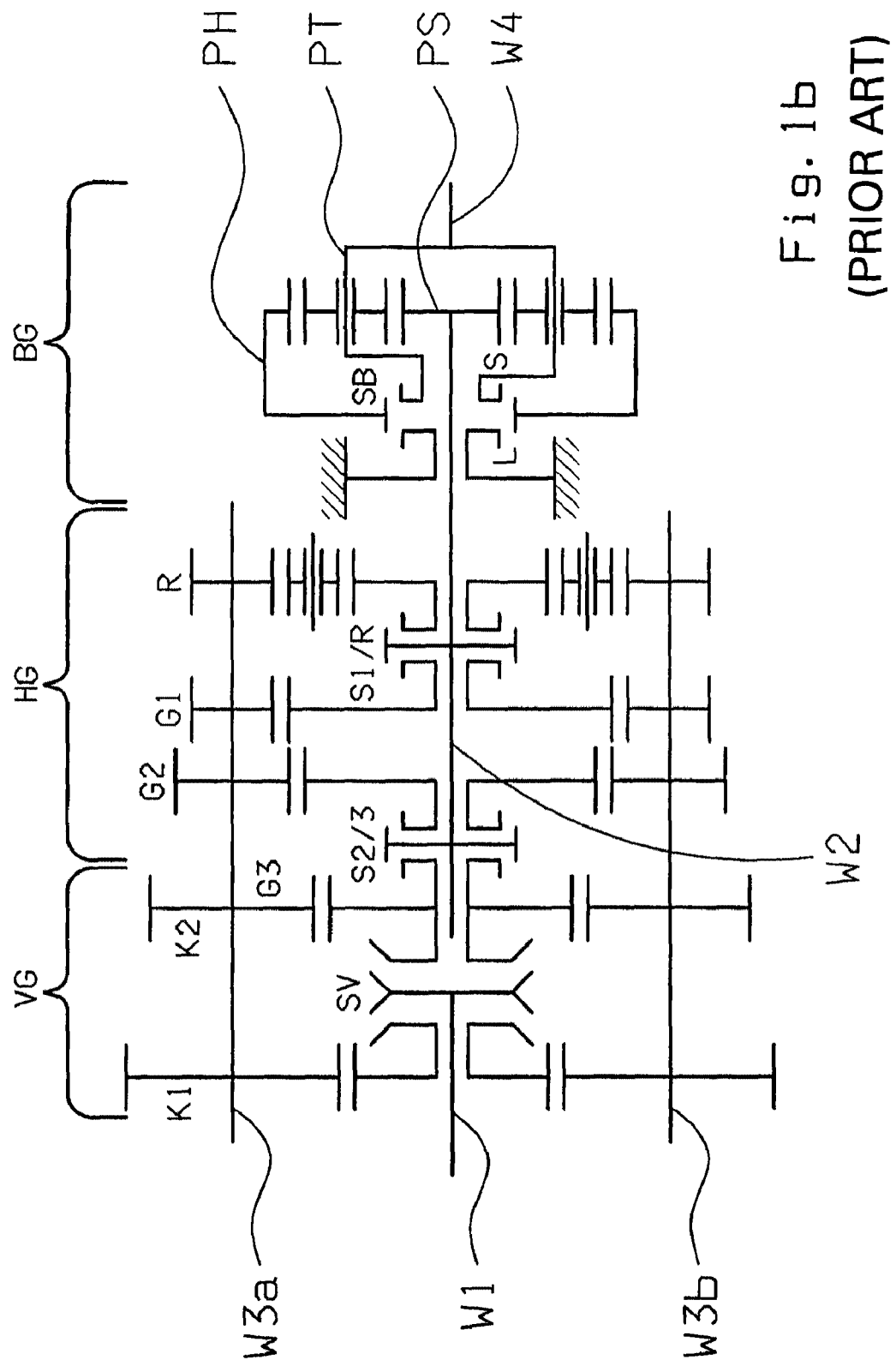
FIG. 1b is a schematic representation of the structure of a known group transmission with a three-stage main transmission

In contrast to the known embodiments of group transmissions described earlier and illustrated in FIGS. 1a and 1b, in the new main transmissions HG the gearset of the lowest transmission ratio G1 is now arranged on the input side next to the direct-shift clutch of the direct gear G4 or G3 and the shifting clutches of the first transmission ratio G1 and of the direct gear G4 or G3 are in each case combined in a common shifting packet S1/4 or S1/3 respectively. The shifting clutches of the other transmission ratios are correspondingly combined in the shifting packets S2/3, SR or S2/R.

The upstream group VG is of two-stage design, also with countershafts, such that the two transmission ratio steps K1 and K2 form two shiftable input constants of the main transmission HG. By virtue of a small ratio difference between the two transmission ratio steps K1, K2 the upstream group VG constitutes a splitter group. The loose wheel of the first transmission ratio step K1 is mounted to rotate on the input shaft W1, which, in the area not covered by the representations in FIGS. 3a and 3b, is connected, via a controllable separator clutch, to a drive motor in the form of an internal combustion engine. The loose wheel of the second transmission ratio step K2 is mounted to rotate on the main shaft W2. The fixed wheels of the two transmission ratio steps K1 and K2 are respectively arranged on the countershafts W3a and W3b extended on the input side. The shifting clutches of the splitter group VG, which are of synchronized design, are combined in the common shifting packet SV.

The range-change group BG in drive connection downstream from the main transmission HG is also of two-stage design, but of planetary structure with a single planetary gearset. However, the range-change group BG can also be designed with countershafts. The sun gear PS is connected in a rotationally fixed manner to the main shaft W2 extended on the output side. The planetary gear carrier PT is coupled rotationally fixed to the output shaft W4 of the group transmission. The ring gear PH is connected to a shifting package SB with two shifting clutches, by means of which the range-change group BG can be shifted alternatively to a slow-driving stage L by connecting the ring gear PH to a fixed part of the housing, or to a fast-driving stage S by connecting the annular gear PH to the main shaft W2 or to the sun gear PS. Alternatively, in a fast-driving stage S (not illustrated), a shift connection can be formed between the ring gear PH and the planetary carrier PT. The structure of the range-change groups would then be similar to that of the range-change groups of the group transmissions in FIGS. 1a and 1b. The shifting clutches of the shifting packet SB are of unsynchronized design, to save costs.

By virtue of the structure of the new group transmissions shown in FIGS. 3a and 3b, in particular due to the arrangement of the gearsets of the transmission ratio steps G1, G2, G3, R or G1, G2, R and the assignment of the shifting packets S1/4 or S1/3 in the respective main transmissions HG, most range shifts can be carried out in these group transmissions without a change of the shift gate or the shifting packet, and therefore substantially more quickly compared with known group transmissions with a standard arrangement of the transmission ratio steps in ascending or descending sequence. This relationship is summarized for the new group transmissions according to FIGS. 3a and 3b in the tables shown in FIGS. 4a and 4b respectively, for various gear intervals.

Figure 5:
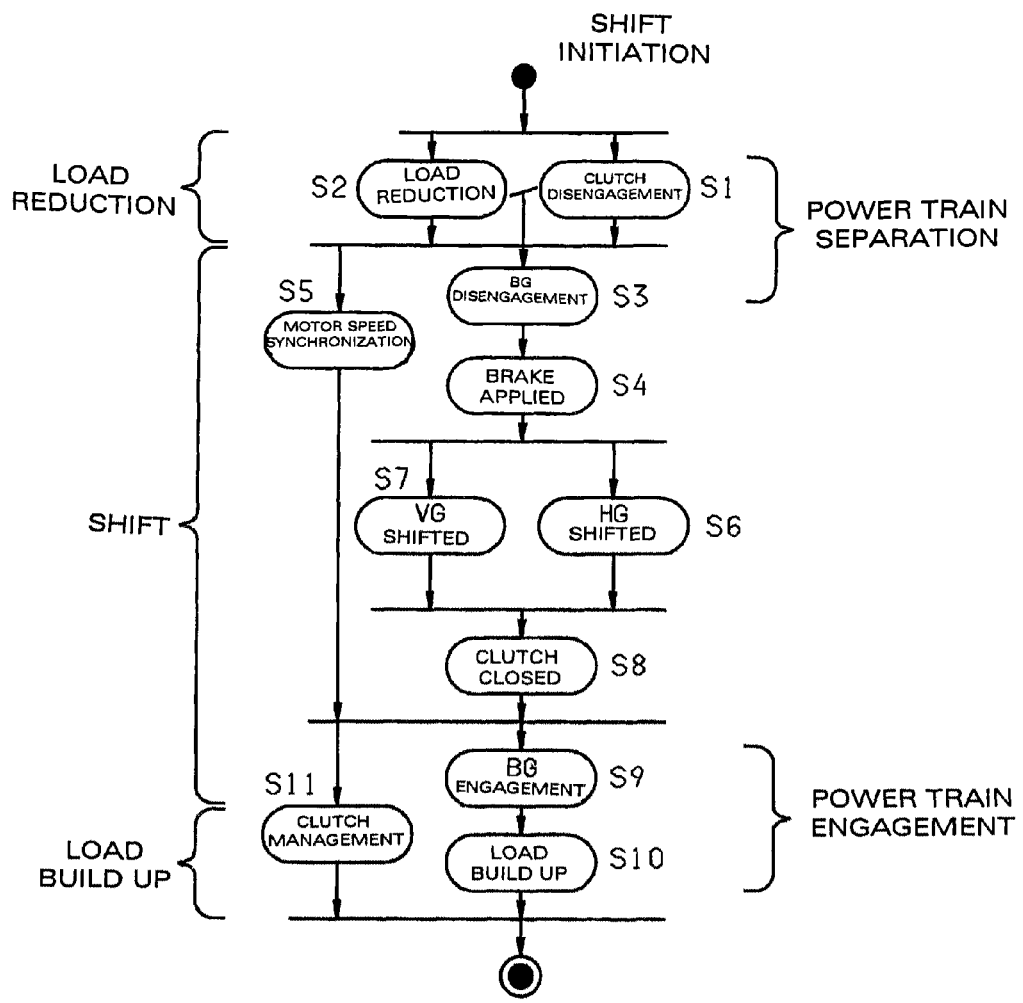
FIG. 5 is a time sequence during a range shift using the method according to the invention, with the new group transmissions shown in FIGS. 3a and 3b

A method according to the invention for controlling a range shift in a group transmission with a claw-shifted range-change group BG is represented in FIG. 5, as an example, in the form of a flow chart for a main transmission HG with the new arrangement of transmission ratios and assignment of shifting packets illustrated in FIGS. 3a and 3b.

Thus, FIG. 5 shows that after the shift has been initiated in step S1, the separator clutch arranged between the drive motor and the input shaft W1 of the group transmission is disengaged and, preferably at the same time, in step S2 the drive motor is controlled to idling. Overlapping in time with this or immediately thereafter, in step S3 the range-change group BG is shifted to neutral (BG disengaged), whereby the group transmission as a whole is separated both from the drive motor and from the drivetrain on the output side, i.e. the vehicle wheels, and is therefore completely free from load. Then, in step S4, the main transmission HG and the splitter group VG are braked almost or completely to rest by a transmission brake (brake applied). At the same time or with some time overlap, in step S5 the adaptation of the motor speed to the synchronous speed of the target gear of the shift operation begins.

In step S6 the change of the transmission ratios in the main transmission HG takes place, and if necessary, at the same time or at an earlier or later time, in step S7 the transmission ratios in the splitter group VG are changed (VG shift).

This makes it clear that in accordance with the flow chart of FIG. 5, with the new arrangement of transmission ratios in the group transmissions according to FIGS. 3a and 3b transmission ratio changes involve only a change within one and the same shift gate or within one shifting packet from one shift position to the other shift position (HG shift; step S6), which can take place substantially more quickly than before so that the time taken to carry out a range shift is shortened.

In step S8 (clutch closed), by at least partial engagement of the separator clutch the range-change group BG is synchronized by an acceleration of the splitter or upstream group VG and of the main transmission HG, and in the next step S9 (BG engaged) the new transmission ratio in the range-change group BG is engaged. After this, in step S10 (load build-up) the drive motor load is increased and at the same time or in parallel, in step S11 engagement the separator clutch is fully engaged.

| Indexes | |
|---|---|
| BG | Range-change group |
| G1 | (First) transmission ratio step (of HG) |
| G2 | (Second) transmission ratio step (of HG) |
| G3 | (Third) transmission ratio step (of HG) |
| G4 | (Fourth) transmission ratio step (of HG) |
| HG | Main transmission |
| $i_{BG}$ | Transmission ratio of BG |
| $i_{HG}$ | Transmission ratio of HG |
| $i_{HG\_min}$ | Lowest transmission ratio of HG |
| K1 | (First) transmission ratio step (of VG) |
| K2 | (Second) transmission ratio step (of VG) |
| L | Slow-driving stage (of BG) |
| PH | Sun gear (of BG) |
| PS | Sun gear (of BG) |
| PT | Planetary gear carrier (of BG) |
| R | Transmission Ratio (of HG) for reversing |
| S | Fast-driving stage (of BG) |
| SB | Shifting packet (of BG) |
| SR | Shifting packet (of HG) |
| SV | Shifting packet (of VG), direct-shift clutch |
| S1 | Process step |
| S2 | Process step |
| S3 | Process step |
| S4 | Process step |
| S5 | Process step |
| S6 | Process step |
| S7 | Process step |
| S8 | Process step |
| S9 | Process step |
| S10 | Process step |
| S11 | Process step |
| S1/2 | Shifting packet (of HG) |
| S1/3 | Shifting packet (of HG) |
| S1/4 | Shifting packet (of HG) |
| S1/R | Shifting packet (of HG) |
| S2/3 | Shifting packet (of HG) |
| S2/R | Shifting packet (of HG) |
| S3/4 | Shifting packet (of HG) |
| VG | Upstream group, splitter group |
| W1 | Input shaft |
| W2 | Main shaft |
| W3a | Countershaft |
| W3b | Countershaft |
| W4 | Output shaft |

The invention claimed is:

1. A shift control method of an automated group transmission comprising a multi-stage main transmission (HG), a multi-stage splitter group (VG), being connected upstream of the main transmission (HG), and a multi-stage range-change group (BG) being connected downstream from the main transmission (HG), the splitter group (VG) being connected, via a controllable separator clutch, to a drive motor, the main transmission (HG) and the range-change group (BG) both being of unsynchronized design and shifting clutches of in each case two transmission ratios in the main transmission (HG) and the range-change group (BG) being respectively combined in a common shifting packet that has two shift positions and a neutral position such that during a range change, in each case, a change between two transmission ratios at least in the main transmission (HG) and the range-change group (BG) takes place, the method comprising the step of:
   relieving a load on the drive motor by disengaging the separator clutch;
   shifting the range-change group to neutral and starting a speed management of the drive motor to bring the drive motor to a synchronous speed of a target gear;
   braking the main transmission and the splitter group by a transmission brake;
   changing the transmission ratios in the main transmission and in the splitter group;
   synchronizing the range-change group by partially engaging the separator clutch;
   engaging a desired transmission ratio in the range-change group;
   at least one of increasing the load on the drive motor and fully engaging the separator clutch at the same time or with a temporary overlap.

2. The method according to claim 1, further comprising the step of either simultaneously or sequentially changing the transmission ratio in the main transmission (HG) and in the splitter group (VG) (step S6, step S7).

3. The method according to claim 1, further comprising the step of changing a gate in the main transmission (HG) together with changing the transmission ratios in the main transmission (HG).

4. The method according to claim 1, further comprising the step of engaging the desired transmission ratio in the range-change group (BG) with the separator clutch at least partially disengaged.

5. The method according to claim 1, further comprising the step of changing a transmission ratio in the splitter group (VG) before braking the main transmission (HG).

6. The method according to claim 1, further comprising the step of braking the main transmission (HG) and the splitter group (VG) to a speed at which a respective claw clutch is shifted.

7. A method of shifting an automated group transmission which comprises a multi-stage main transmission (HG), a multi-stage splitter group (VG) being connected upstream from the main transmission (HG) in a flow of drive and a multi-stage range-change group (BG) being connected downstream from the main transmission (HG) in the flow of drive, the splitter group (VG) being connected, via a controllable separator clutch, to an internal combustion engine, each of the main transmission (HG) and the range-change group (BG) having at least one claw clutch that is shiftable in a shifting packet between two gear ratios and a neutral position such that at least each of the main transmission (HG) and the range-change group (BG) shift to a different transmission ratio during a range change, the method comprising the steps of:

disengaging the separator clutch to interrupt the flow of drive from the internal combustion engine to the splitter group (VG);

shifting the claw clutch of the range-change group (BG) to the neutral position and managing the internal combustion engine to adjust the flow of drive therefrom to a synchronous speed of a target gear;

braking the main transmission (HG) and the splitter group (VG) with a transmission brake;

shifting each of the main transmission (HG) and the splitter group (VG) to the respective different transmission ratio;

synchronizing the range-change group (BG) by partially engaging the separator clutch;

engaging the target gear in the range-change group (BG);

at least partially simultaneously increasing the flow of drive from the internal combustion engine and fully engaging the separator clutch.

* * * * *